United States Patent [19]
Tibbetts et al.

[11] Patent Number: 5,587,257
[45] Date of Patent: Dec. 24, 1996

[54] METHOD OF MAKING LITHIUM-ION CELL HAVING DEACTIVATED CARBON ANODES

[75] Inventors: Gary G. Tibbetts, Birmingham; Gholam-Abbas Nazri, Bloomfield Hills; Blake J. Howie, Almont, all of Mich.

[73] Assignee: General Motors Corporation, Detroit, Mich.

[21] Appl. No.: 514,896

[22] Filed: Aug. 14, 1995

[51] Int. Cl.$^6$ .................................................. H01M 4/58
[52] U.S. Cl. ..................... 429/218; 429/194; 423/445 R; 423/447.6; 423/448; 423/460
[58] Field of Search ................................. 429/218, 194; 423/445 R, 447.6, 448, 460

[56] References Cited

U.S. PATENT DOCUMENTS

| | | | |
|---|---|---|---|
| 4,671,907 | 6/1987 | Iwahashi | 423/445 R |
| 4,725,422 | 2/1988 | Miyabashi et al. | 423/445 R |
| 4,738,753 | 4/1988 | Corato et al. | 423/445 R |
| 5,215,651 | 6/1993 | Yamamoto et al. | 423/445 R |
| 5,312,611 | 5/1994 | Takami et al. | 423/447.6 |
| 5,326,658 | 7/1994 | Takahashi et al. | 429/218 |
| 5,340,670 | 8/1994 | Takani et al. | 429/218 |

OTHER PUBLICATIONS

Extended Abstract vol. 94–2, Fall Meeting of The Electochemical Society, Inc. held Oct. 9–14, 1994 in Miami Beach, FL, was first available Aug. 3, 1994.
INTERFACE of The Electrochemical Society, vol. 3, No. 3, Fall, 1994, was first available Aug. 16, 1994.
Proceedings vol. #94–28, Rechargeable Lithium and Lithium Ion (RCT) Batteries, was first available May 12, 1995.
Letter dated Aug. 18, 1995 from Electrochemical Society specifying dates the foregoing ECS documents were first available to the public.
J. Rodrigues–Mirasol et al, Extended Abstracts, 21st Biennial Conference on Carbon, Buffalo, 549 (1993).

Primary Examiner—Bruce F. Bell
Attorney, Agent, or Firm—Lawrence B. Plant

[57] ABSTRACT

A method of making a secondary, lithium-ion cell having a carbon anode including the step of deactivating the carbon anode by heating the carbon in the presence of oxygen for a time sufficient and at a temperature sufficient to selectively oxidize undesirable, highly reactive carbon atoms therefrom prior to assembling the cell, and a stochiometrically balanced cell made from such deactivated carbon.

15 Claims, 6 Drawing Sheets

METHOD OF MAKING LITHIUM-ION CELL HAVING DEACTIVATED CARBON ANODES

This invention relates to secondary, lithium-ion cells having deactivated, Li-intercalatable carbon anodes, and more particularly to a method for reducing the chemical reactivity of such anodes with lithium and the cell's electrolyte while, at the same time, enhancing the carbon anode's capacity to intercalate lithium.

BACKGROUND OF THE INVENTION

Secondary, lithium-ion cells and batteries are well known in the art. One such lithium-ion cell comprises essentially a carbonaceous anode, a lithium-retentive cathode, and a non-aqueous, lithium-ion-conducting electrolyte therebetween. The carbon anode comprises any of the various forms of carbon (e.g., coke, graphite etc.) which are capable of reversibly retaining lithium species. Graphite is favored by many for its high lithium-retention capacity. Carbon fibers are particularly advantageous because they have excellent mechanical properties which permit the making of rigid electrodes which withstand degradation during repeated charge-discharge cycling. Moreover, their high surface area allows rapid charge/discharge rates. The carbon may be pressed into a porous conductor or, more commonly, bonded to an electrically conductive carrier (e.g. copper foil) by means of a suitable organic binder. The cathode comprises such materials as electronically conductive polymers (e.g., polyaniline, polythiophene and their derivatives) or transition metal chalcogenides which are bonded to an electrically conductive carrier (e.g., aluminum foil) by a suitable organic binder.

Carbon anodes and transition metal chalcogenide cathodes reversibly retain lithium by an intercalation mechanism wherein lithium species become lodged within the lattices of the carbon and chalcogenide materials. In the carbon anode, there is a partial charge transfer between the lithium species and the "π" bonds of the carbon, whereas in the metal chalcogenide cathode there is nearly a total charge transfer between the lithium species and the transition metal component of the metal chalcogenide. Chalcogenides known to be useful in lithium-ion cells include oxides, sulfides, selenides, and tellurides of such metals as vanadium, titanium, chromium, copper, molybdenum, niobium, iron, nickel, cobalt and manganese with nickel and cobalt oxides being among the more popular cathode materials used commercially.

Manganese oxide has been proposed as a low cost alternative to the nickel and cobalt oxides.

Lithium-ion cell electrolytes comprise a lithium salt dissolved in a vehicle which may be (1) completely liquid, or (2) an immobilized liquid, (e.g., gelled, or entrapped in a polymer matrix), or (3) a pure polymer. Known polymer matrices for entrapping the electrolyte include polyacrylates, polyurethanes, polydialkylsiloxanes, polymethacrylates, polyphosphazenes, polyethers, and polycarbonates, and may be polymerized in situ in the presence of the electrolyte to trap the electrolyte therein as the polymerization occurs. Known polymers for pure polymer electrolyte systems include polyethylene oxide (PEO), polymethylene-polyethylene oxide (MPEO) or polyphosphazenes (PPE). Known lithium salts for this purpose include, for example, $LiPF_6$, $LiClO_4$, $LiSCN$, $LiAlCl_4$, $LiBF_4$, $LiN(CF_3SO_2)_2$, $LiCF_3SO_3$, $LiC(SO_2CF_3)_3$, $LiO_3SCF_2CF_3$, $LiC_6F_5SO_3$, and $LiO_2CF_3$, $LiAsF_6$, and $LiSbF_6$. Known organic solvents (i.e., vehicles) for the lithium salts include, for example, propylene carbonate, ethylene carbonate, dialkyl carbonates, cyclic ethers, cyclic esters, glymes, lactones, formates, esters, sulfones, nitriles, and oxazolidinones.

Lithium cells made from pure polymer electrolytes, or liquid electrolytes entrapped in a polymer matrix, are known in the art as "lithium-polymer" cells, and the electrolytes therefor are known as polymeric electrolytes. Lithium-polymer cells are often made by laminating thin films of the anode, cathode and electrolyte together wherein the electrolyte layer is sandwiched between the anode and cathode layers to form an individual cell, and a plurality of such cells are bundled together to form a higher energy/voltage battery.

It is known to electrolytically preload carbon anodes with lithium prior to assembling the cells. Such cells are referred to herein as "anode-loaded" cells. Lithium preloading is accomplished by making the carbon the cathode in an electrolysis cell having a nonaqueous electrolyte (akin to the electrolyte used in the battery) and electrolytically loading the lithium therein. Thereafter, the battery is assembled in the fully charged state with an essentially lithium-free cathode material. Anode-loaded cells frequently have some of their lithium content reacted with, and chemically bound or entrapped by, the carbon so as not to be available for reversible intercalation with the cathode material.

Another known approach to manufacturing lithium-ion cells having carbon anodes is to preload the lithium-retentive cathode material with all of the lithium the cell requires and then to assemble the cell with a carbon anode having little or no lithium in it. Such carbon-anode, lithium-ion cells assembled from lithium-retentive cathodes which have been preloaded with lithium are hereinafter referred to as "cathode-loaded" cells. In the case of transition metal chalcogenides, preloading of the cathode is preferably accomplished during the manufacture of the metal chalcogenide material itself, since it has been found that lithium-metal chalcogenides (e.g., $LiMn_2O_4$) can be manufactured having a crystal structure more desirable for intercalating larger quantities of lithium species than chalcogenides first loaded with lithium, in situ, during charging of the cell against an anode preloaded with lithium.

Unfortunately, "cathode-loaded" cells have some problems. In the first place, cathode-loaded cells are inefficient because some of the initial capacity of the cell (i.e., as measured by the amount of lithium preloaded into the cathode) is lost during the first charge-discharge cycle of the cell because it is not thereafter available for subsequent reversible interaction with the electrodes. As a result, it has become common practice to provide cathode-loaded cells with excess preloaded cathode material when the cell is first assembled in order to compensate for the amount of lithium expected to be lost (i.e., rendered irreversible) in the first cycle. This, of course, results in a cell having electrodes which are stoichiometrically unbalanced, as far as their relative reversible lithium retention capability is concerned, since after the first cycle more lithium-retention capacity (i.e., more cathode material) resides in the cathode than is needed to accommodate the reversible lithium species intercalated in the carbon anode. Such excess cathode material adds to the size, weight and cost of the cell. In the second place, cathode-loaded/carbon cells tend to evolve gas during the first cycle of the battery incident to decomposition of the electrolyte's solvent. Such gassing not only produces a combustible gas, but can cause delamination of laminated electrodes in full assembled cells, swelling of sealed cells, separation of the active material from its metal substrate current collector and depletion and contamination (i.e., by reaction byproducts) of the electrolyte all of which contribute to increase the cells internal resistance. The aforesaid problems are particularly troublesome in larger batteries such as might be used to propel an electric or hybrid-electric vehicle.

The problem of excess cathode material in cathode-loaded cells may in part be due to certain inefficiency inherent in the cathode material itself. Hence, for example, some chalogenides (e.g., vanadium oxide) have a very high (nearly 100%) first cycle efficiency (i.e., against deactivated carbon). On the other hand, Li-manganese oxide cathodes have only about 90%–95% first cycle efficiency (i.e., against deactivated carbon) owing to an inherent inability of the manganese oxide cathode to give up all of its lithium to the anode.

SUMMARY OF THE INVENTION

The problem with the anode-loaded cells and the first and second problems with the cathode-loaded cells are believed to be attributed at least in part to the presence of highly reactive carbon atoms in the carbon anode which create many "active sites" throughout the carbon. Active sites are defect, surface, and edge sites which are characterized by unsaturated interatomic bonds that are prevalent on the ends of the carbon chains and at stacking faults or cracks in the carbon. Such sites have potential energies above the electrodeposition potential of lithium and are more prevalent in smaller carbon particles.

Active sites are troublesome in anode-loaded cells, because these sites serve to collect and chemically retain/ entrap lithium which, though present in the battery, is not available for reversible exchange with the cathode. Active carbon sites are troublesome in cathode-loaded cells because they are seen to promote (1) decomposition of the electrolyte's solvent, (2) gas evolution within the assembled cell incident to such decomposition, and (3) the non-useful consumption of some of the preloaded lithium thereby rendering such lithium unavailable for reversible interaction between the electrodes. Moreover, the extent of electrolyte decomposition is sensitive to the surface area of the carbon. Hence, as used herein, the term "highly reactive" carbon atoms is intended to mean those carbon atoms within the carbon anode which either cause decomposition of the cell's electrolyte (i.e., its solvent) during charging of the cell or which cause the lithium to be so chemically bound up within the carbon as to render it unavailable for reversible exchange with the cathode material. While highly graphitic or fully graphitized carbon tend to have a higher intercalation capacity for lithium than the lower or nongraphitic forms of carbon, they still contain untoward amounts of highly reactive carbon atoms which must be deactivated to avoid electrolyte decomposition and lithium entrapment.

The present invention overcomes the aforesaid problems by heating the anode carbon in the presence of oxygen for a time and at a temperature sufficient to selectively react the highly reactive carbon atoms in the anode carbon with oxygen so as to remove such atoms as gaseous $CO$ or $CO_2$, and thereby strip or cleanse the anode carbon of any reactive sites prior to intercalating the anode with lithium. This $O_2$-treatment of the carbon may be effected after the anode has been fabricated, but will preferably be preformed on the carbon particles prior to fabricating anodes therefrom. This $O_2$-treatment not only reduces chemical entrapment of lithium in the anode, but can reduce electrolyte decomposition/gassing by a factor of about ten (10), while, at the same time, increasing the capacity of the carbon to intercalate Li and permitting the manufacture of cells having more stochiometrically balanced anode and cathode materials.

DETAILED DESCRIPTION OF THE INVENTION

The invention will better be understood when considered in the light of the following detailed description of certain specific embodiments thereof which is given hereafter in conjunction with the several Figures in which:

In one embodiment, the present invention relates to the method of making a cathode-loaded, secondary, lithium-ion cell wherein an $O_2$-treated, lithium-intercalatable, carbon anode is positioned opposite a lithium-retentive cathode preloaded with a quantity of lithium species with a non-aqueous, lithium-ion-conducting electrolyte therebetween (i.e., separating the anode from the cathode). In another embodiment, $O_2$-treated, anode carbon is preloaded with lithium and then assembled, as above, opposite a cathode which is essentially free of lithium. In both embodiments, the anode carbon is treated with oxygen at an elevated temperature for a time sufficient to deactivate the carbon (i.e., selectively remove highly reactive carbon atoms therefrom).

According to the first embodiment, a more stochiometrically balanced cell is provided wherein the amount of lithium-preloaded cathode material present is substantially only enough to provide that quantity of lithium species as is needed to satisfy the lithium intercalation capacity of the carbon anode, and to reversibly shuttle back and forth between the anode and cathode during charge-discharge cycling of the cell. In this regard, substantially no extra lithium preloaded cathode material is provided to compensate for lithium species which are nonusefully lost to active sites on highly reactive carbon in the carbon anode during the first discharge-charge cycle of the cell(s). The only extra lithium present in the cathode, if any, is to compensate for any inefficiency that is inherent in a particular preloaded cathode material (e.g., $LiMn_2O_4$). The use of $O_2$-treated anode carbon permits the fabrication of cells/batteries having balanced, or closely-matched electrodes (i.e., reversiblelithium-capacity-wise), and higher energy and power densities. Moreover, elimination of highly reactive carbon atoms, and the reactive sites associated therewith, eliminates decomposition of the electrolyte during the first cycle and the attendant cell-destructive gassing that results therefrom inside assembled cell(s).

According to the second embodiment, the anode carbon is heated in the presence of oxygen to selectively remove the highly reactive carbon atoms and then electrochemically intercalated with lithium. With the removal of the highly reactive carbon atoms, no lithium is chemically retained by the carbon and substantially all of the intercalated lithium is available for reversible interaction with a cathode material assembled therewith in the essentially Li-free state (i.e., except as needed to accommodate lithium retention inefficiencies inherent in the cathode material). The use of $O_2$-treated anode carbon permits the fabrication of cells/batteries having balanced, or closely-matched electrodes (i.e., reversible-lithium-capacity-wise), and higher energy and power densities.

The aforesaid advantages, as well as increased capacity for lithium intercalation, are obtained by heating the anode carbon in the presence of oxygen for a time and at a temperature sufficient to selectively oxidize, gasify and remove at least the highly reactive carbon atoms from the carbon.

After the highly reactive carbon atoms are removed, continued oxygen treatment progressively removes lesser reactive carbon atoms and increases the lithium intercalation capacity of the carbon on a unit weight basis. Prolonged treatment of the carbon at elevated temperatures, however, eventually consumes the carbon. As the treatment temperature and/or the $O_2$ concentration increases the treatment time decreases and vice versa. Treatment times can vary from about 0.1 to about 10 hours. Oxygen treatment will preferably be carried out for about ½ hour to about 4 hours in air heated from about 600° C. to about 700° C. Below about 400° C. the highly reactive sites are not removed. Above about 800° C. the $O_2$ rapidly oxidizes all of the carbon atoms. $O_2$-enriched air may be substituted for air if accelerated treatment times are sought, but care must be taken to so control the oxidation rate so as not to degrade the carbon. For the same treatment time, treatment temperatures will be decreased owing to the more reactive atmosphere. The $O_2$-treatment need only be enough to remove the highly reactive carbon, and leave the carbon with substantially only enough residual lithium-retention capacity to reversibly intercalate the amount of reversible lithium contained in the cathode. Oxygen treatment beyond that needed to remove the highly reactive carbon atoms, but before complete degradation of the carbon, tends to provide additional Li intercalation capacity (on a unit weight basis).

A preferred lithium-ion cell in accordance with the present invention will comprise an $O_2$-treated anode, a transition metal chalcogenide cathode, and an electrolyte therebetween. Most preferably, the transition metal chalcogenide will comprise manganese oxide, and the electrolyte will be immobilized in a polymer matrix (i.e., a lithium-polymer cell).

Different forms of carbon (e.g., coke, graphite, etc.), and even similar carbons provided by different manufacturers, will require different lengths of time for complete deactivation using the same temperature and $O_2$ concentration since deactivation time is a direct function of the concentration of the highly reactive carbon atoms in the particular carbons being treated.

Anodes may be made from $O_2$-treated carbon by a variety of techniques. For example, carbon particles (preferably fibers) may be pressed into a copper or nickel foam under a pressure of about 1000 tons/cm². Another technique involves mixing the carbon particles with an organic binder, and applying the mix to an appropriate metal substrate (e.g., copper foil). One known such technique involves mixing about 5 percent to about 10 percent by weight ethylene propylene diene monomer (EPDM) with the carbon particles. In this regard, carbon particles are added to a 4 percent by weight solution of EPDM in a cyclohexane or xylene solvent to form a slurry. This slurry is then ground (e.g., by ball milling or micronizing) to a thick, ink-like consistency. The slurry is then poured onto a metal substrate and then drawn over the surface of the substrate with a doctor blade, or the like, to provide a layer of carbon on the substrate which layer has a thickness determined by the height of the doctor blade above the substrate and generally in the range of about 50 microns to about 200 microns. The solvent is allowed to evaporate so as to leave the carbon adhering to the substrate by means of the EPDM which has polymerized in the process. Still another technique for making such electrodes involves diluting the ground, ink-like slurry material discussed above with additional solvent (i.e., cyclohexane or xylene) and spraying it onto the metal substrate by means of an air brush type spray gun or the like.

SPECIFIC EXAMPLES

A number of test carbon electrodes were made from a proprietary, carbon fiber provided by Applied Science, Inc. of Dayton, Ohio under the trade name PYROGRAF®. These fibers were vapor grown by a process like that described in U.S. Pat. No. 5,024,818 and 5,324,415. The fibers were then partially graphitized by heating at 2000° C. for 4 hours in flowing argon gas. A weighed sample of approximately 0.2 g was then placed in a cylindrical mullite boat, with the fibers dispersed as much as possible to allow uniform oxidation, and inserted in a sealed mullite tube furnace. The furnace was warmed at 5° C./minute to the $O_2$-treatment temperature, and the fibers were treated at an air flow rate of 100 cm³/minute for a fixed duration. Afterwards, the furnace was cooled at the same 5° C./minute rate. The fibers were removed and weighed when the temperature dropped below 100° C. Twelve air treatment experiments were performed at durations ranging from ½ to 4 hours, and at temperatures from 640 to 720° C. Table 1 lists these experiments as 1–12, along with the temperature and duration of etching and initial and final masses. However, in some of the experiments too little material remained for electrochemical testing.

TABLE 1

| | Experimental Conditions and Results | | | |
|---|---|---|---|---|
| Expt. | T (C) | Time (Min) | Mo (g)[1] | M (g)[2] |
| 1 | 625 | 30 | 0.116 | 0.111 |
| 2 | 700 | 30 | 0.111 | 0.043 |
| 3 | 700 | 60 | 0.124 | 0.032 |
| 4 | 700 | 30 | 0.126 | 0.058 |
| 5 | 670 | 240 | 0.16 | 0.009 |
| 6 | 650 | 240 | 0.159 | 0.044 |
| 7 | 630 | 240 | 0.163 | 0.074 |
| 8 | 600 | 240 | 0.155 | 0.135 |
| 9 | 660 | 240 | 0.363 | 0.02 |
| 10 | 720 | 60 | 0.268 | 0.008 |
| 11 | 655 | 240 | 0.205 | 0.008 |
| 12 | 640 | 240 | 0.462 | 0.187 |

TABLE 1-continued

Experimental Conditions and Results

| Expt. | T (C) | Time (Min) | Mo (g)[1] | M (g)[2] |
|---|---|---|---|---|
| 13 | 550 | 2 | 0.114 | 0.111 |
| 14 | 650 | 30 | 0.104 | 0.003 |
| 15 | 575 | 30 | 0.102 | 0.074 |
| 16 | 600 | 30 | 0.103 | 0.059 |

[1] weight before $O_2$ treatment
[2] weight after $O_2$ treatment

Four samples of ungraphitized PYROGRAF® fibers were also treated for reference purposes. In these experiments, the mass lost from the four ungraphitized PYROGRAF® samples after $O_2$ treatments in air of 2 minutes to 30 minutes and temperatures from 550° C. to 650° C. were determined and reported as items 13–16 in Table 1.

To fabricate the anodes, about 4 mg/cm² of the graphitized and $O_2$-treated fibers were pressed at 2 tons/cm² for one hour into a thin Cu open-cell foam conducting substrate.

Figure 7:
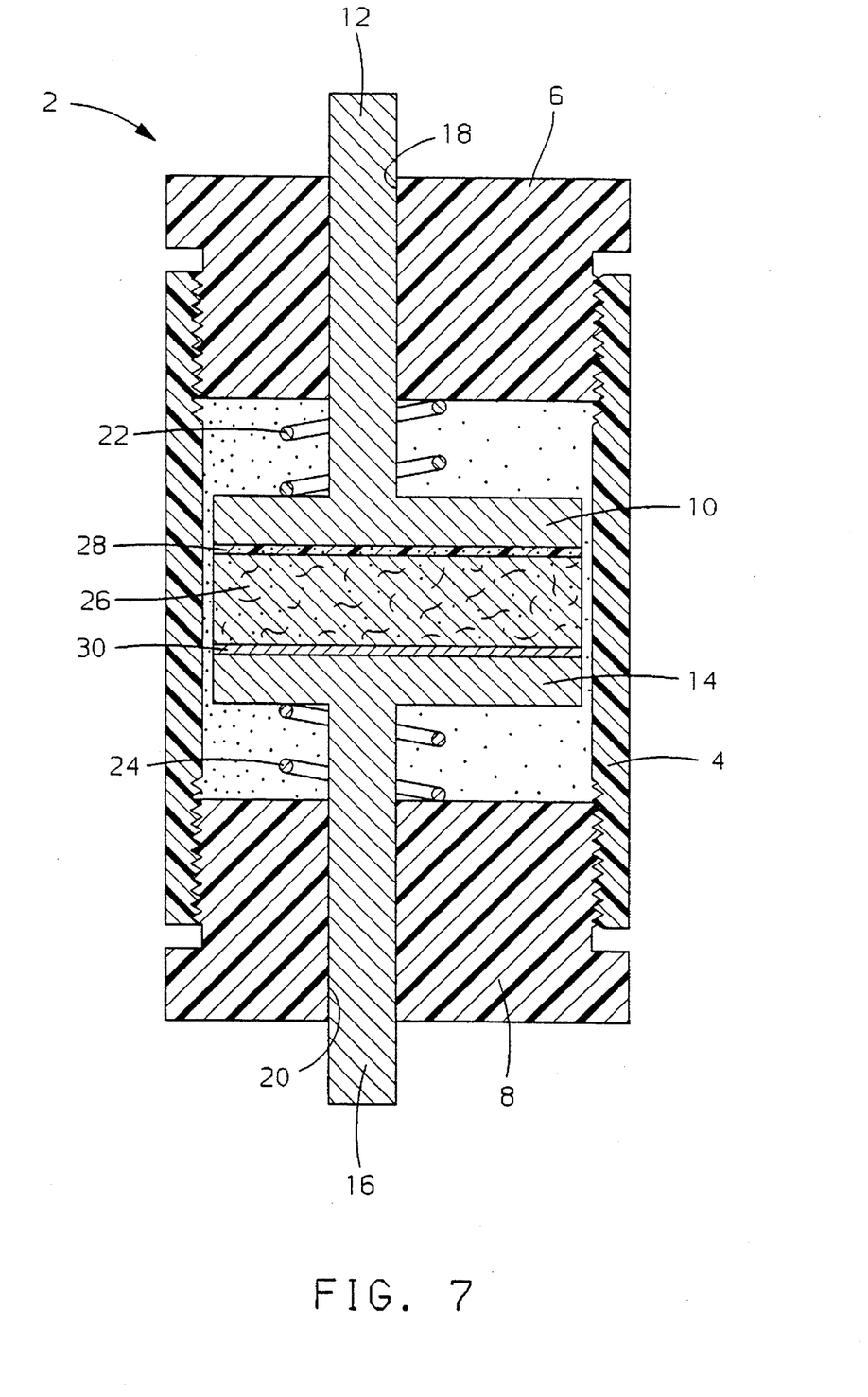
FIG. 7 depicts a test cell used to intercalate lithium into the carbon anodes.

Carbon electrodes made as set forth above were cathodized in an electrolysis cell like that shown in FIG. 7 to intercalate them with lithium and then cycled to study their charge-discharge efficiency. FIG. 7 shows a test cell 2 comprising an annular polypropylene housing 4 having two threaded polypropylene end plugs 6 and 8. A nickel current collector 10 is connected by a nickel bar 12 to the exterior of the housing 4. A nickel current collector 14 is connected by a nickel bar 16 to the exterior of the housing 4. The bars 12 and 16 are adapted to slide axially in the respective openings 18 and 20 in end plugs 6 and 8 respectively for setting the spacing between the current collectors 10 and 14. Springs 22 and 24 bias the current collectors 10 and 14 toward each other to compress a glass mat 26 therebetween and provide an interelectrode gap of about 0.001 inch. The glass mat 26 was saturated with an electrolyte solution comprising a 1.3 molar solution of lithium perchlorate in propylene carbonate. The carbon anode material 28 being tested was attached to the current collector 10, and a lithium film 30 was attached to the current collector 14. In addition, a 5 mg sample of the graphitized fibers was subjected to a thermo-gravimetric analysis (TGA) in flowing air at a heating rate of 3° C./minute and the results therefrom compared to other test results obtained.

Finally, the structure of the fibers before and after $O_2$ treatment were compared by X-ray diffractometry. The X-ray diffraction apparatus was an 18 kW rotating copper anode from Rigaku operated at 50 kV and 100 mA. A scintillation detector was mounted in a Siemens D-500 goniometer operated in the Bragg-Brentano mode. The data points were 0.02° apart, and each point averaged X-rays for 3 seconds.

RESULTS

Oxidation of the carbon proceeds either by $$C + O_2 \rightarrow CO_2 \tag{1}$$

or by $$2C + O_2 \rightarrow 2CO. \tag{2}$$

Calculations with the computer program HSC [Outokumpu HSC Chemistry for Windows, version 2.0] revealed that at equilibrium in excess oxygen and a temperature of 550° C., carbon dioxide is favored; while carbon monoxide formation is favored when carbon is in excess and over 650° C. The decomposition of a mass "m" of fibers will therefore depend on the absolute temperature "T" and time "t" according to $$\frac{dm}{dt} = -b(T) \cdot m. \tag{3}$$

The decomposition rate constant "b(T)" may be calculated from the initial mass "$m_0$" and a mass "m" (final mass) measured after oxidizing the carbon for a duration "t" as $$b(T) = \frac{1}{t} \cdot \ln\left(\frac{m_0}{m}\right). \tag{4}$$

If "b(T)" has the usual temperature activated form $$b(T) = v \cdot \exp\left(\frac{E}{kT}\right), \tag{5}$$

then ln(b(T)) would be expected to be a linear function of 1/T and dependent on a preexponential constant v, the Boltzmann constant k, and an activation energy E.

Figure 1:
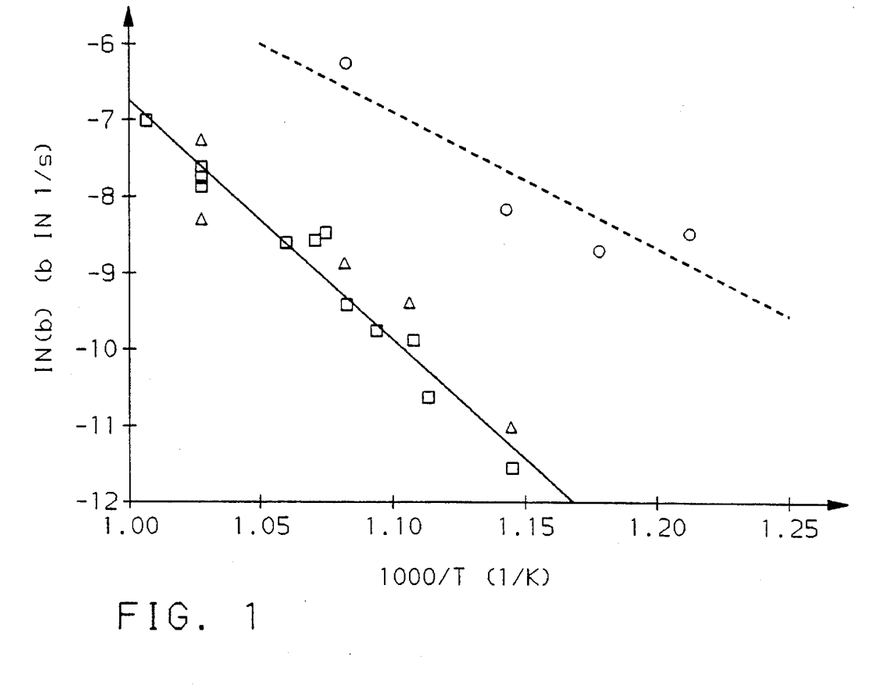
FIG. 1 is a graph showing the logarithmic oxidation rate of as-grown carbon fibers (open circles) and graphitized carbon fibers (open squares), as well as electrochemical data (triangles) reflecting the rate of disappearance of the electrolyte decomposition plateau, all as a function of the reciprocal absolute temperature.

The initial and final masses, oxidation treatment durations, and temperatures were recorded for all of the tests conducted, and the "b(T)" values were calculated from equation (4) both for the as-grown and partially graphitized fibers. As shown in FIG. 1, both sets of values of "ln(b)" displayed a fairly linear dependence on reciprocal temperature with the oxidation rate of the ungraphitized material (open circles) being larger than that of the partially graphitized material (open squares). The slope of the least squares fit to the oxidation rate curve for the ungraphitized fibers corresponds to an activation energy of 147 kJ/mole, while the value for the graphitized fibers is 269 kJ/mole.

Figure 2:
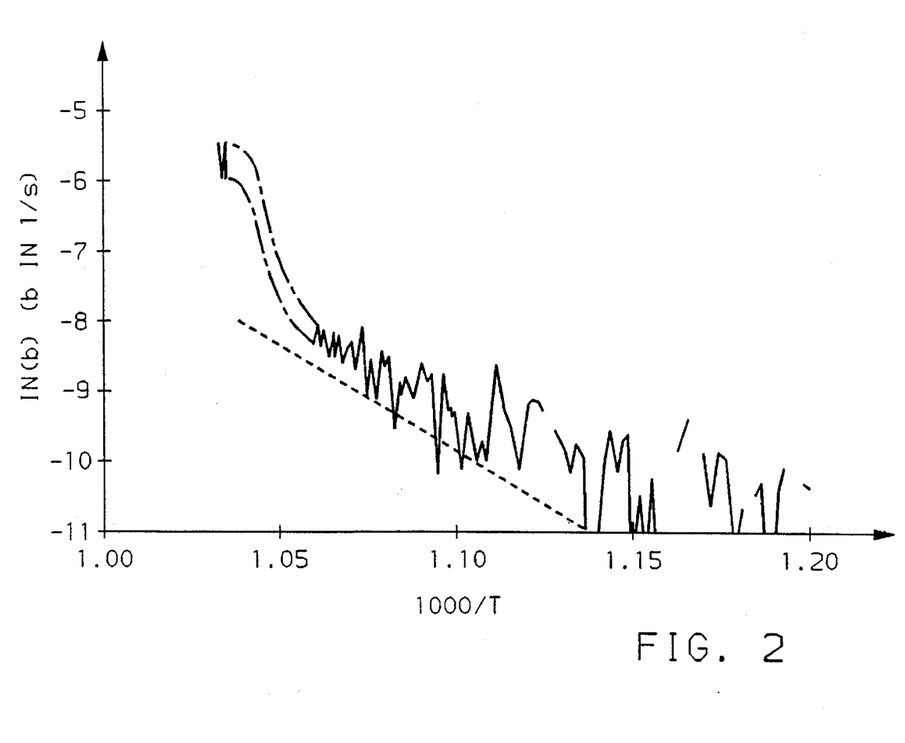
FIG. 2 is a graph showing the logarithmic oxidation rate of graphitized carbon fibers.

The large number of data points provided by TGA allows direct calculation of "b(T)" from the differential formulation of equation 3. The results are plotted in FIG. 2, along with the least squares fit to the oxidation data for the graphitized fibers from FIG. 1. As indicated in FIG. 2, the oxidation rates are very comparable down to 1/T=1.05(679° C.).

At temperatures higher than 679° C., the slope of the oxidation rate rises substantially, as the highly oxidized material presents a more faulted structure for the oxygen to attack and control of the process becomes more difficult. The small offset between the two curves is believed to correspond to different oxygen concentration in the two different experiments. Otherwise, the general agreement of the data provides confidence in the kinetic formulation.

Figure 3A:
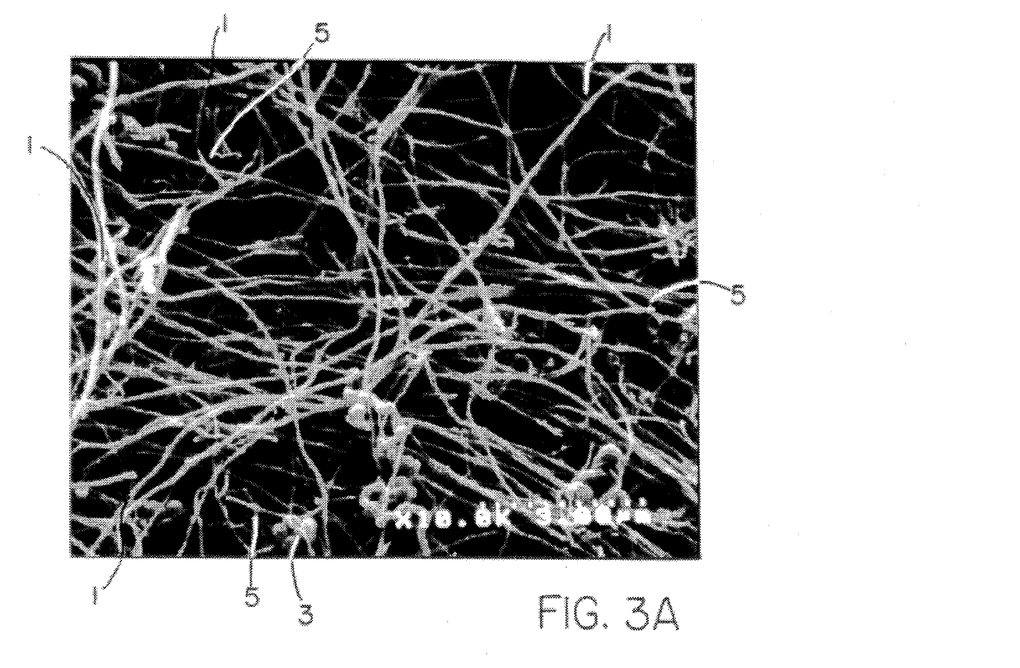
FIGS. 3a and 3b are scanning electron microscope (SEM) micrographs at 10KX and 40KX, respectively, of graphitized fibers before $O_2$ treatment.
Figure 3B:
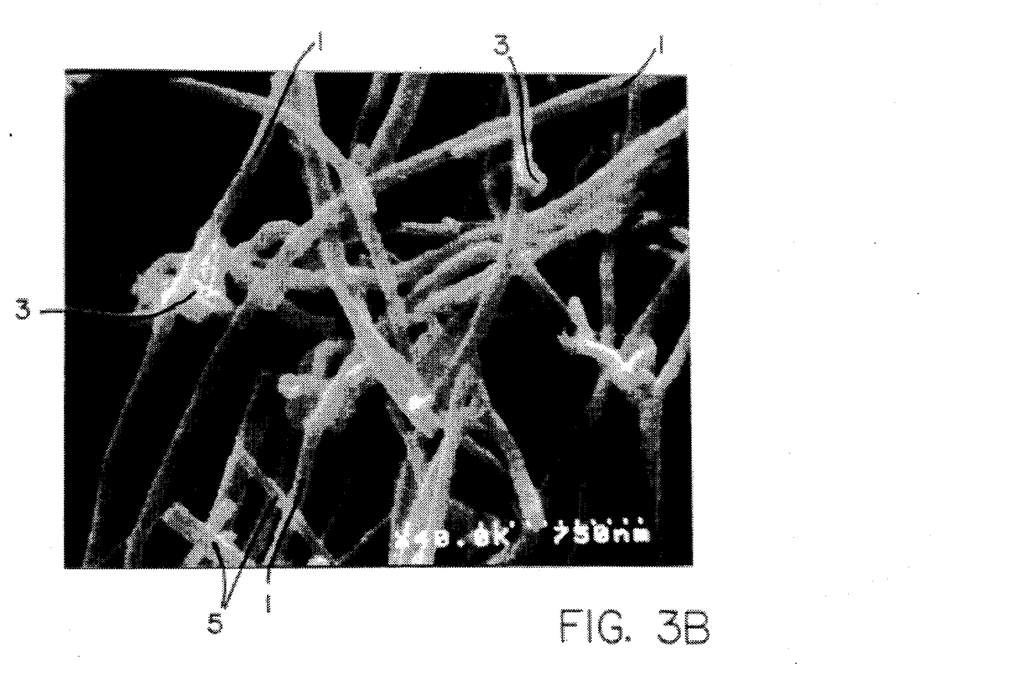
Figure 4A:
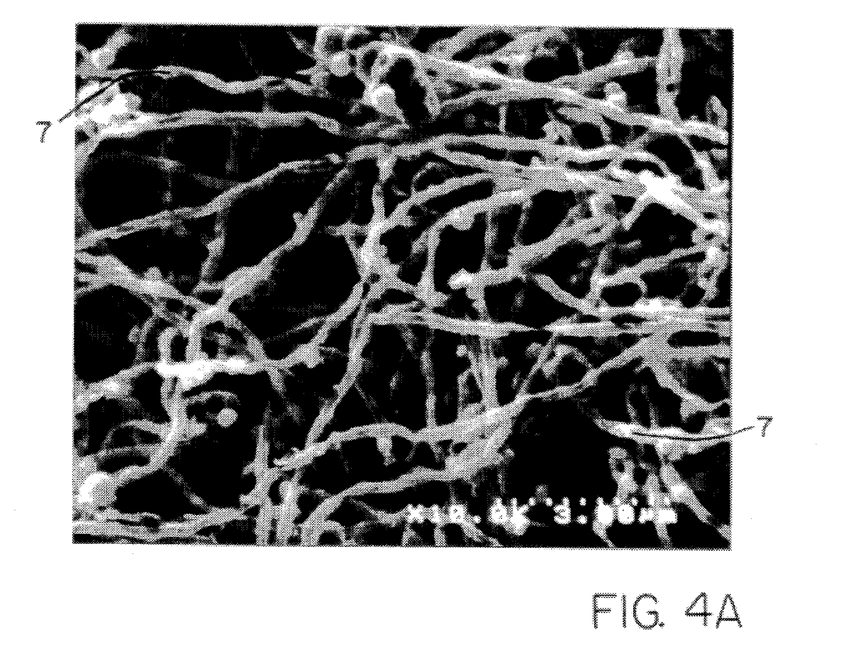
FIGS. 4a and 4b are SEM micrographs at 10KX and 40KX, respectively, of graphitized carbon fibers after oxidation in flowing air at 650° C. for 4 hours.
Figure 4B:
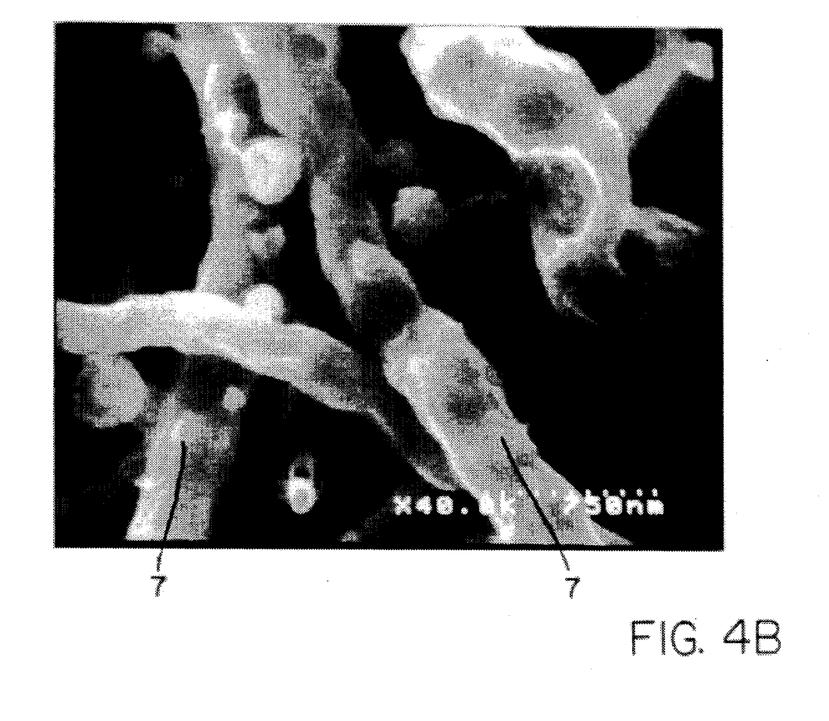

Scanning electron micrographs (SEM) of the graphitized, but unoxidized, fibers are shown in FIG. 3 at 10,000 ×magnification (i.e., 10K×) (FIGS. 3a) and 40K×(FIG. 3b). The SEMs show long, uniform fibers 1 about 80 nm in diameter with some attached carbon black 3 and dispersed short fragments 5. FIG. 4 are SEMs at 10K×(4a) and 40K×(4b) of graphitized and oxidized fibers and that the material which was strongly oxidized by the $O_2$ becomes knobby 7 and nonuniform. Surprisingly, the $O_2$ treatment caused the diameter to increase markedly to over 300 nm. This is believed to result from a general hollowing out of the carbon fibers, followed by a relaxation of the curved layer planes as the highly reactive carbon atoms are removed.

Figure 5:
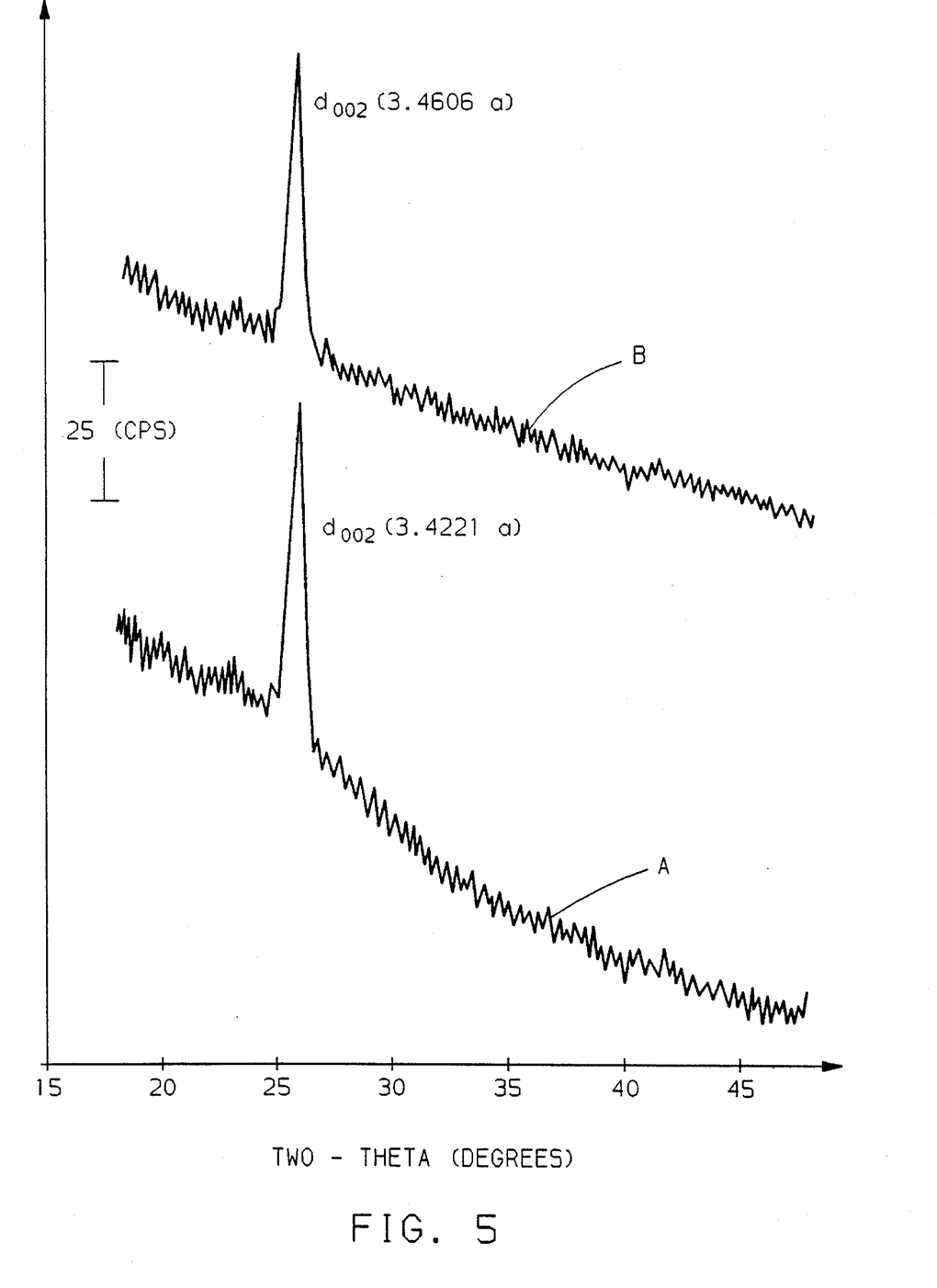
FIG. 5 shows X-ray diffraction scans of carbon fibers before (a), and after (b), $O_2$-treatment at 650° C. for 4 hours.

X-ray diffractometry curves shown in FIG. 5 reveal the structural differences brought about by the oxidation of the present invention. The d spacing between the hexagonal (002) lattice planes expands from 0.342 nm for unoxidized graphitized fibers (pattern "a") to 0.346 nm for the oxidized fibers (pattern "b"). This expansion is accompanied by a narrowing of the (002) peak from a full width at half max of 0.939° to 0.843° Thus, it seems that the oxidation expands interlayer spacing, perhaps partially exfoliating the fibers to increase the lithium capacity.

Electrochemical tests were conducted in the test cell shown in FIG. 7 using graphitized fibers $O_2$-treated at different temperatures for different time periods.

Electrochemical tests were conducted in a dry box containing less than 1 PPM moisture and oxygen. The cell was connected (i.e., via nickel bars 12 and 14) to a MACCOR battery cycler which controlled an applied constant current of 0.1 mA/cm$^2$ and accumulated charge during several charge-discharge cycles. Data recorded on a PC386 computer that monitored the cells.

Figure 6:
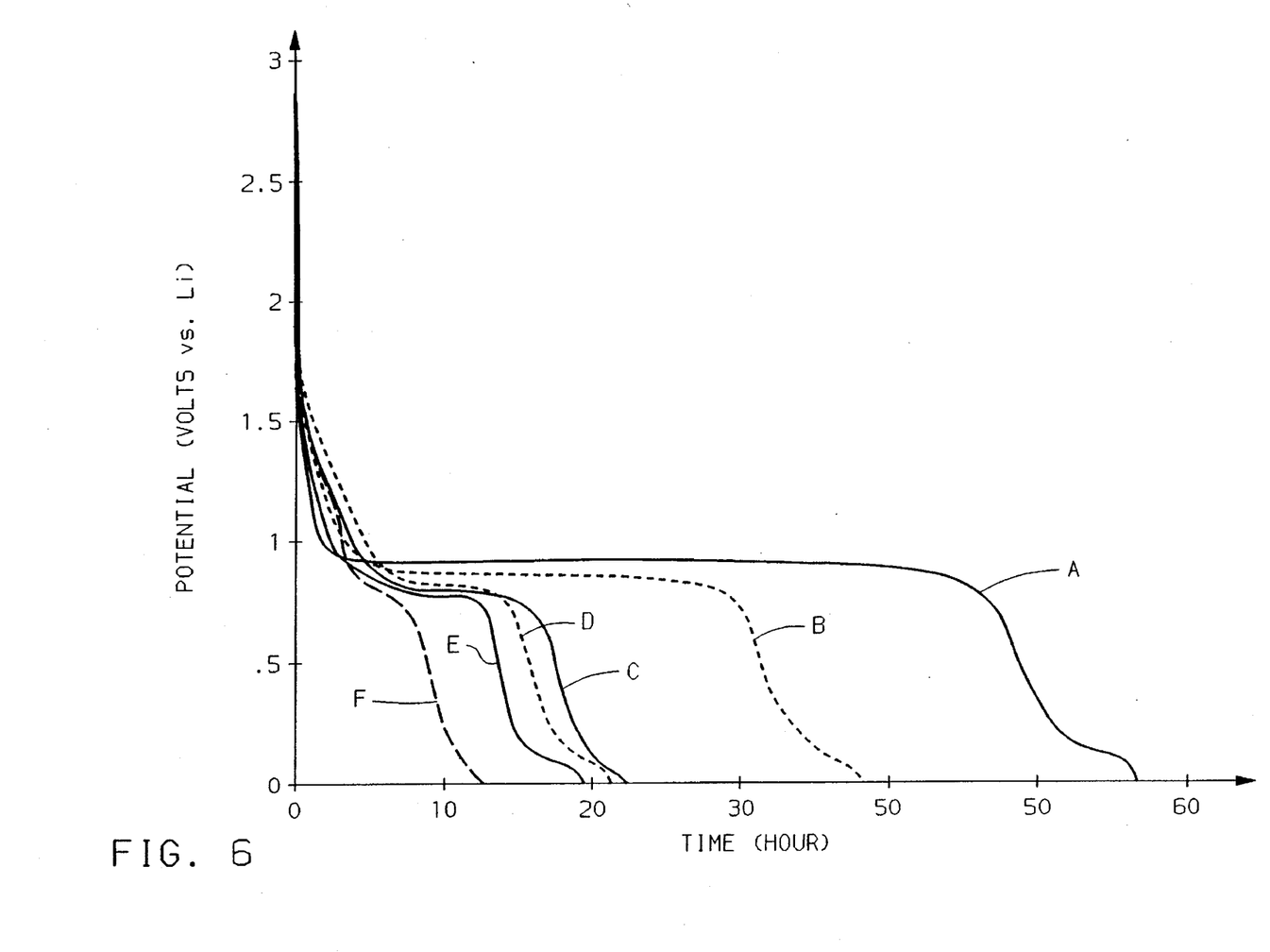
FIG. 6 is the voltage profile of several unoxidized and $O_2$-treated graphitized carbon fibers during initial Li intercalation.

The results of the electrochemical tests are shown in FIG. 6. Nonoxidized graphitized fibers were used as a baseline for reference purposes. Electrolyte decomposition for all samples was observed at 0.8 volts with respect to the lithium metal. The extent of the electrolyte decomposition is indicated by the area under the 0.8 volt plateau of each curve.

Hence for the baseline sample the extent of electrolyte decomposition corresponds to the 1256 mAh/g (i.e., 0.56 electronic charges per carbon atom) area under the 0.8 volt plateau of curve A. This value of charge is compared to the values obtained from similarly graphitized fibers oxidized for different time periods at different temperatures when the value is normalized to the mass in grams of carbon in each anode tested. More specifically, partially graphitized fibers (i.e., heat treated to 2000° C.) were oxidized in abundant flowing air (i.e., 100 cm$^2$/minute) at 600° C. for four (4) hours (Curve B), 700° C. for one (1) hour (Curve C), 700° C. for 30 minutes (Curve D), 630° C. for four (4) hours (Curve E) and 650° C. for four (4) hours (Curve F). These samples were fixtured in the test cell (FIG. 7), and charged and discharged at the same current as the nonoxidized baseline sample (Curve A). As FIG. 6 shows, the area under the 0.8 volt plateau (i.e., the extent of electrolyte decomposition) was reduced significantly by oxidizing the carbon so as to selectively remove the highly reactive carbon therefrom. FIG. 6 summarizes the data and shows that the best oxidation treatment (i.e., Curve F) reduced the $O_2$-treatment plateau area almost a factor of 10 to 135 mAh/g (0.060 electronic charges per carbon atom).

By substituting plateau area (in mAh/g) for "m", and using the initial unoxidized value of 1256 as "$m_0$", an electrochemical rate may be determined from equation (4). These electrochemical rate values are plotted as triangles in FIG. 1 and cluster about the least squares fit to the data describing the mass change during oxygen treatment which confirms that the electrolyte decomposition plateau disappears at essentially the same rate as highly reactive carbon is selectively removed from the carbon mass.

Finally, the reversible lithium intercalation capacity for test samples B, C, E, and F was determined and shown to be 102 mAh/g, 160 mAh/g, 135 mAh/g and 167 mAh/g respectively which shows that reversible lithium intercalation capacity increases as $O_2$-treatment temperature and time increases.

In general, the test results are consistent with the concept that controlled oxidation selectively removes the more active carbon atoms, (i.e., those capable of decomposing the electrolyte or chemically entrapping lithium) at a greater rate than atoms from more graphitic sites. Surprisingly, much of the etching appears to be from the interior of the fiber, greatly changing the fiber's morphology and possibly accounting for the increased lithium intercalation capacity observed. Finally, the X-ray results indicate that the d-spacing becomes more uniform even as the lattice expands. Seemingly the CO and $CO_2$ produced partially exfoliates some of the graphitic planes.

While the invention has been described primarily in terms of certain specific embodiments thereof it is not intended to be limited thereto but rather only to the extent set forth hereafter in the claims which follow.

What is claimed is:

1. In the method of making a secondary, lithium-ion cell including the principle step of positioning an anode and a cathode opposite each other with a non-aqueous, lithium-ion conducting electrolyte therebetween wherein said anode comprises a reversible-lithium-intercalateable carbon and said cathode comprises a reversible-lithium-intercalateable material, the improvement comprising, prior to said positioning, heating said carbon in the presence of oxygen for a time and at a temperature sufficient to selectively oxidize, gasify and remove from said carbon at least those highly reactive carbon atoms therein that would otherwise decompose said electrolyte and/or entrap lithium in said cell.

2. In the method of making a secondary, anode-loaded, lithium-ion cell including the principle step of positioning an anode and a cathode opposite each other with a non-aqueous, lithium-ion conducting electrolyte therebetween wherein said anode comprises carbon intercalated with reversible lithium and said cathode comprises a lithium-retentive material which intercalates said reversible lithium during the charging of said cell, the improvement comprising prior to said positioning, heating said carbon in the presence of oxygen for a time and at a temperature sufficient to selectively oxidize, gasify and remove from said carbon at least those highly reactive carbon atoms therein that would otherwise react with, and non-usefully chemically consume, lithium and render it electrochemically non-reversible in said cell.

3. In the method of making a secondary, cathode-loaded, lithium-ion cell including the principle step of positioning an anode and a cathode opposite each other with a non-aqueous, lithium-ion-conducting electrolyte therebetween, wherein said anode comprises lithium-intercalatable carbon and said cathode comprises a lithium-retentive material substantially saturated with a quantity of electrochemically reversible lithium species, the improvement comprising, before said positioning, heating said carbon in an oxygen-containing atmosphere for a time and at a temperature sufficient to selectively oxidize, gasify and remove from said carbon at least those highly reactive carbon atoms therein that would otherwise react with and decompose said electrolyte during the initial charging of said cell and leave said carbon with sufficient residual lithium capacity to reversibly intercalate said quantity of reversible lithium species.

4. The method according to claim 3 wherein said atmosphere comprises air.

5. The method according to claim 4 wherein said temperature is at least about 400° C. and less than about 800° C.

6. The method according to claim 4 wherein said time varies inversely with respect to said temperature between about 0.1 hours and about 10 hours.

7. Method according to claim 4 wherein said carbon is heated for about four hours at about 650° C.

8. A substantially stoichiometrically balanced lithium-polymer cell comprising a polymeric electrolyte interposed between a lithium-intercalateable carbon anode and a lithium-intercalateable cathode wherein said carbon (a) has a lithium intercalateability which substantially matches the lithium intercalatebility of said cathode, (b) is substantially unreactive with said electrolyte and lithium species during the first electrochemical cycle of said cell, and (c) was deactivated by selectively oxidatively removing highly reactive carbon atoms from said carbon prior to assembly of said cell.

9. The cell according to claim 8 wherein said cathode material comprises a transition metal chalcogenide.

10. The cell according to claim 9 wherein said transition metal chalcogenide is an oxide.

11. The cell according to claim 10 wherein said transition metal comprises manganese.

12. The cell according to claim 8 wherein said electrolyte is substantially immobilized in a polymer matrix.

13. The cell according to claim 11 wherein said cathode material comprises a transition metal oxide.

14. The cell according to claim 13 wherein said transition metal is manganese.

15. The cell according to claim 14 wherein said cathode material comprises lithium manganese oxide.

* * * * *